United States Patent [19]
Lang

[11] Patent Number: 5,509,494
[45] Date of Patent: Apr. 23, 1996

[54] AUXILIARY POWER STEERING

[75] Inventor: Armin Lang, Schwäbisch Gmünd, Germany

[73] Assignee: ZF Friedrichshafen AG, Allemagne, Germany

[21] Appl. No.: 475,095

[22] Filed: Jun. 7, 1995

Related U.S. Application Data

[63] Continuation of Ser. No. 193,036, Feb. 4, 1994, abandoned.

[30] Foreign Application Priority Data

Aug. 6, 1991 [DE] Germany .................. 41 26 020.1

[51] Int. Cl.⁶ ............................................ B62D 5/06
[52] U.S. Cl. .................... 180/132; 180/147; 91/374; 74/388 PS
[58] Field of Search ........................... 180/132, 147, 180/148, 146, 149; 74/388 PS; 91/374, 375 R

[56] References Cited

U.S. PATENT DOCUMENTS

| | | | |
|---|---|---|---|
| 4,627,510 | 12/1986 | Camus | 180/148 |
| 4,699,231 | 10/1987 | Lang et al. | 180/148 |
| 5,147,007 | 9/1992 | Kahrs et al. | 180/148 |

Primary Examiner—Margaret A. Focarino
Assistant Examiner—Victor E. Johnson
Attorney, Agent, or Firm—Larson & Taylor

[57] ABSTRACT

In an auxiliary power steering intended especially for motor vehicles, a pinion (2) positioned in a steering housing (1) engages a steering rack (9). A steering valve (14) that is used to control the pressure medium for the auxiliary power steering provides two inlet-seat valves (15, 16) and two outlet-seat valves (17, 18) whose closing bodies (20, 21, 35, 36) can be shifted in the axial direction by a rotary movement of a steering spindle. Closing bodies (20, 21) of inlet-seat valves (15, 16) can be biased in the closing direction by the force of pressure springs (22, 23). In the process, pressure springs (22, 23) bias the closing bodies (20, 21) of inlet-seat valves (15, 16) only if the particular outlet-seat valves (17, 18) are in their neutral position. Each pressure spring (22, 23)—when steering valve (14) is in the neutral position—keeps closing body (20, 21) of the particular inlet-seat valve (15, 16) resting against a valve seat (26, 27) that is fixed on the housing. When steering valve (14) is shifted from its neutral position, then one of the outlet-seat valves (17, 18) in each case will lift the pressure spring (22, 23) of the particular inlet-seat valve (15, 16) over the disc (24, 25) and off the closing body (20, 21) of inlet-seat valve (15, 16).

9 Claims, 2 Drawing Sheets

5,509,494

AUXILIARY POWER STEERING

This application is a continuation of application Ser. No. 08/193,036, filed on Feb. 4, 1994, which is a Section 371 continuation of PCT/EP92/01741 filed on Jul. 31, 1992.

FIELD OF THE INVENTION

This invention relates to auxiliary power steering, particularly for motor vehicles. The auxiliary power steering contains a steering valve including two inlet-seat valves and two outlet-seat valves, whose closing bodies can be shifted in the axial direction by a rotary movement of a steering spindle. The closing bodies of the inlet-seat valves can be biased in the closing direction by the force of closing springs.

BACKGROUND OF THE INVENTION

Such an auxiliary steering is known as steering rack auxiliary power steering from EP-B1-01 92 641. To prevent leakage losses at the inlet-seat valves, their closing springs are made comparatively strong. Different activation forces result for the purpose of opening the inlet-seat valves, on the one hand, and the outlet-seat valves, on the other hand. A relatively high activation moment is required on the manual steering wheel upon initiating the steering movement so as to build up pressure; that is because the force of the closing spring must also overcome the force of the centering spring. On the other hand, only the force of the centering spring is important when it comes to reducing the pressure in the servomotor. That makes steady adjustment of the pressure difficult because the activation force constantly fluctuates back and forth between turn-on and turn-off force and the driver gets the feeling that the steering sticks.

The steering valve is known from a steering rack auxiliary power steering. Such a steering valve can be used with the same effect in other auxiliary power steering apparatus, for example, in a ball-nut auxiliary power steering apparatus.

SUMMARY OF THE INVENTION

The task of the invention is to improve an auxiliary power steering of this kind such that during its activation one attains a pressure-torque characteristic that will provide an essentially steady course without any noteworthy hysteresis.

This problem is solved by an auxiliary power steering in which the closing spring of the inlet-seat valve is also effective when it comes to opening the outlet-seat valve. The problem is solved particularly in that the closing springs exert pressure on the closing bodies of the inlet-seat valves only when the particular outlet-seat valves are in their neutral position. In the process, each closing spring, when the steering valve is in the neutral position, holds the closing body of the particular inlet-seat valve so that—via an auxiliary movable disc—it will come to rest against a valve seat that is solidly attached in the housing. Also, the steering valve is so designed that—when it is shifted out of the neutral position of one of the outlet-seat valves—the closing spring of the particular inlet-seat valve will be lifted off over the disc by the closing body of the inlet-seat valve.

In one particularly advantageous embodiment, each outlet-seat valve provides an axially movable closing body that—when the steering valve is in the neutral position—maintains a first interval with respect to the disc by means of an activation surface and that, with the help of a closing surface, maintains a second interval with respect to a valve seat that is arranged on the closing body of the inlet-seat valve, whereby the size of the second interval is greater than the size of the first interval.

The advantages attained with the help of the auxiliary power steering according to the invention in particular consist in the fact that the two inlet-seat valves are pressed against the particular valve seat by the force of their closing springs only when the steering valve is in the neutral position and thus they close hermetically. As soon as the steering valve has been adjusted, the closing springs of the particular inlet-seat valve, which is to be activated, is lifted off the closing body of the inlet-seat valve by the particular outlet-seat valve. The inlet-seat valve then remains closed until such time as the particular outlet-seat valve has been closed. As a result, the closing body can move free of any spring forces so that the valve can be adjusted freely in keeping with the required pressure. The activation moment, which corresponds to the combined forces of the particular closing spring and the centering spring, can no longer vary substantially.

The invention will be described in greater detail below, with the help of a practical example of a steering rack auxiliary power steering illustrated by the drawings. The invention however can also be used for other auxiliary power steering apparatus, for example, a ball-nut auxiliary power steering. Other objects, features and advantages of the invention will be set forth in, or apparent from, the following description of the preferred embodiments of the invention.

DETAILED DESCRIPTION OF THE PREFERRED EMBODIMENTS

Figure 4:
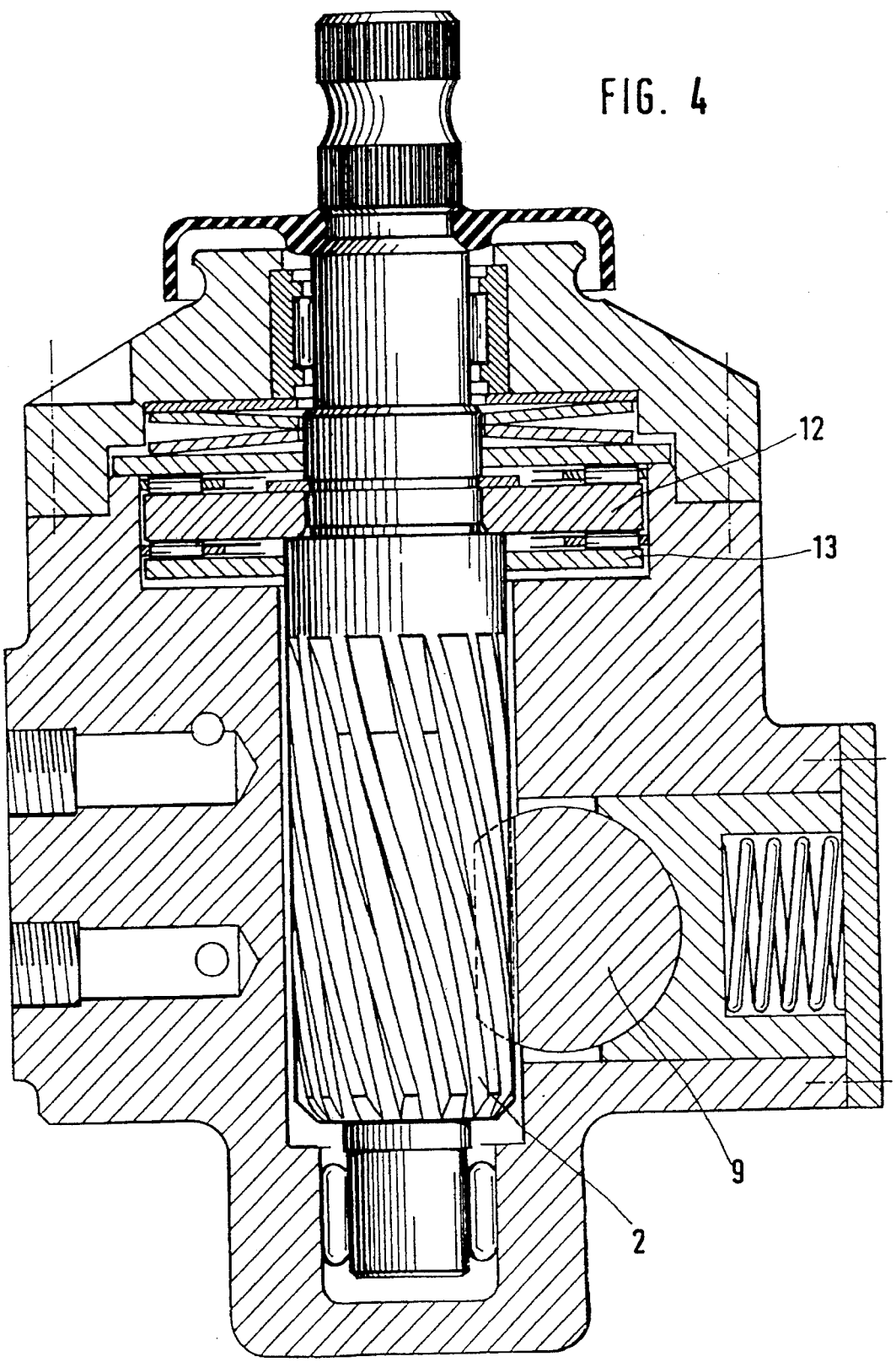
FIG. 4 is another longitudinal profile through the auxiliary power steering according to the invention.

In a steering housing 1, an obliquely-toothed or spirally-toothed pinion 2 is positioned rotatably and in an axially movable manner within certain limits. At one of its ends, pinion 2 has a steering spindle connection 3 for connection to a steering member, for example, a manual steering wheel (not shown). Via its oblique toothing, pinion 2 engages a steering rack 9 whereby pinion 2 is guided in an axially movable manner in steering housing 1 as shown in FIG. 4.

Figure 1:
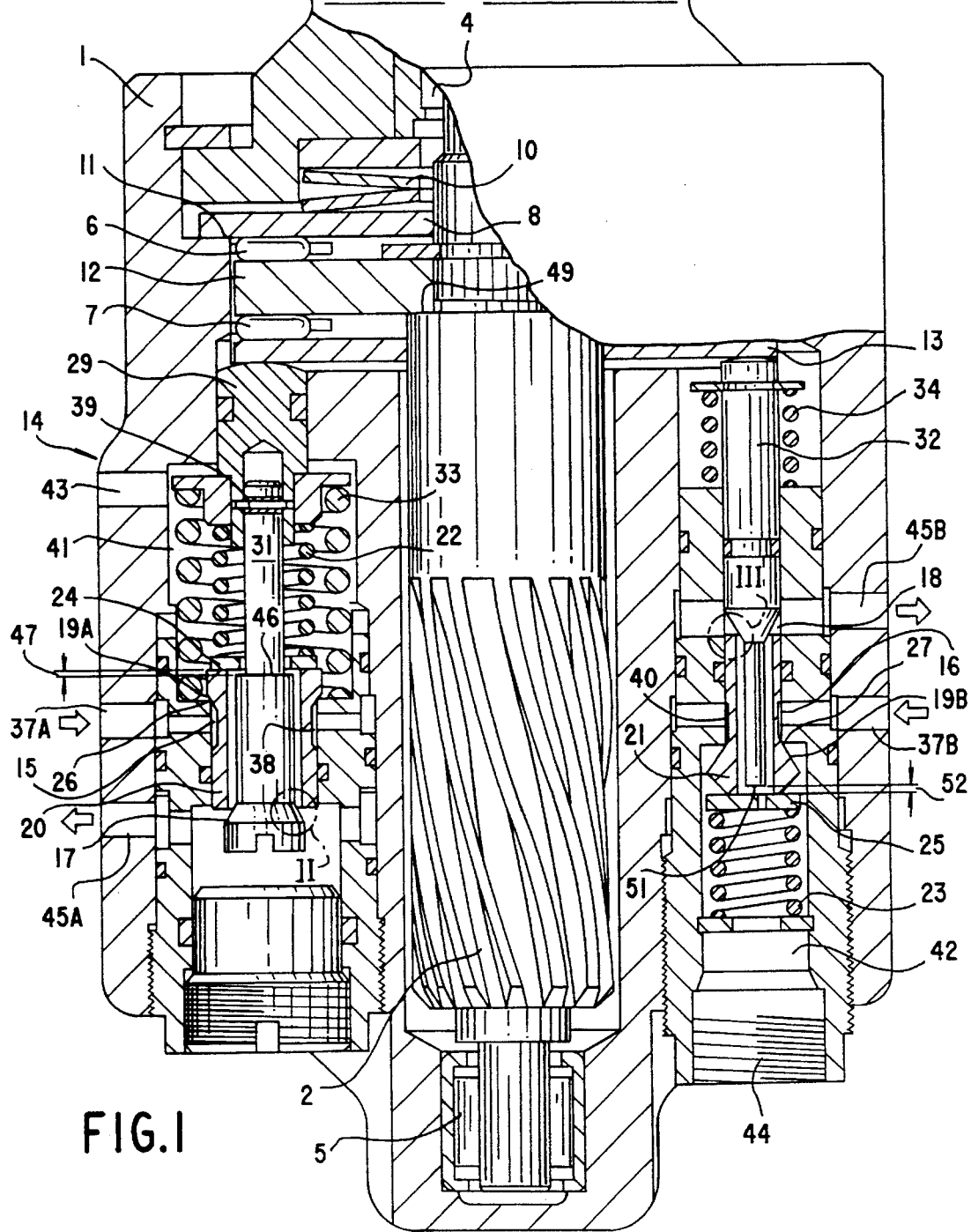
FIG. 1 shows a longitudinal profile through the auxiliary power steering according to the invention with the steering valve in the neutral position.

Referring to FIG. 1, pinion 2 is positioned by means of two radial bearings 4 and 5 and two axial bearings 6 and 7. The axial positioning is accomplished by a bearing disc or washer 8 that is forced—via a first spring arrangement 10 in the form of plate springs against a guide shoulder 11 in a steering housing 1. Axial bearing 6 is arranged between bearing disc or washer 8 and a centering collar 12 which is connected with pinion 2 and rests on a circumferential shoulder 49. On the other side of the centering collar 12, there is arranged an axial bearing 7 that is forced against centering collar 12 by a second spring arrangement (to be described in greater detail later) via an activation disc 13.

To control the pressure medium conveyed by a servopump (not shown) to and from the pressure chambers of a servomotor (not shown), a steering valve 14 made up of two inlet-seat valves 15 and 16 and two outlet-seat valves 17 and 18 is employed. Inlet-seat valves and outlet-seat valves 15, 16, and 17, 18, respectively, are arranged essentially parallel to pinion 2. As shown in FIG. 1, one inlet-seat valve 15 or 16 and one outlet-seat valve 17 or 18 are in each case arranged coaxially with respect to each other.

When steering valve 14 is in the neutral position, inlet-seat valves 15 and 16 are closed. This is attained by having the protruding contact surfaces 19A and 19B of the closing bodies 20 and 21 forced against valve seats 26 and 27, respectively, which are fixed on the housing, by pressure springs 22 and 23, respectively, via axially movable discs 24 and 25, respectively.

Figure 2:
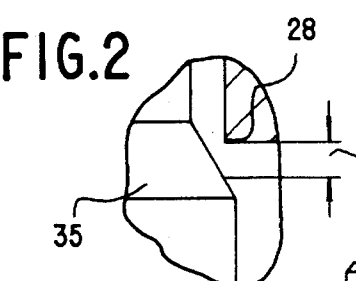
FIG. 2 is an enlarged view of the encircled area II in FIG. 1.
Figure 3:
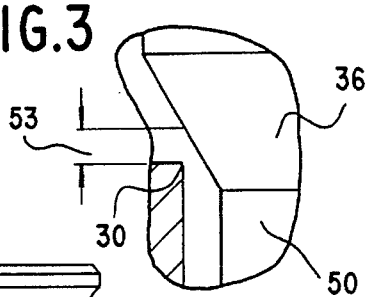
FIG. 3 is an enlarged view of the encircled area III in FIG. 1.

Valve seats 28 and 30 shown in FIGS. 2 and 3, are formed for outlet-seat valves 17 and 18, respectively, in the boreholes of closing bodies 20 and 21 of inlet-seat valves 15 and 16. Closing surfaces 35 and 36 of outlet-seat valves 17 and 18, respectively, are formed on two valve plungers 31 and 32, which are pressed against activation disc 13 by pressure springs 33 and 34. Valve plunger 31 is pressed against activation disk 13 via pushing member 29 which is fixedly connected to valve plunger 31 by radial pin 39.

Valve seats 28 and 30 are so associated with closing surfaces 35 and 36 that—when steering valve 14 is in the neutral position—outlet-seat valves 17 and 18 will be opened. Pressure spring 33 of outlet-seat valve 17 is made relatively strong because this spring is required to open the inlet-seat valve 15. Besides, pressure spring 33 must be in a position to push closing body 20 upward over valve plunger 31, even when the valves work with hydraulic feedback. Pressure spring 34 of outlet-seat valve 18, on the other hand, is made relatively weak because it need only overcome the friction of a seal arranged on valve plunger 32. This spring 34 is not required for the actual operation of the steering valve 14 and therefore can be omitted entirely, if desired.

Pressure spring 33—likewise in cooperation with pressure spring 34—forms the above-mentioned second spring arrangement. The force of the first spring arrangement 10 is about twice as great as the force of the second spring arrangement so that—when steering valve 14 is in a neutral position—pinion 2 and activation disc 13 can be centered accurately and without any play. When pinion 2 is shifted upward, this movement is countered by the force of the first spring arrangement 10, while the force of the second spring arrangement supports the movement. When pinion 2 is shifted downward, only the force of the second spring arrangement works against this movement. This means that identical forces are at work in both the upward and downward axial directions.

A feed connection is provided to supply the steering with pressure medium conveyed by the servopump. In the drawings, this feed connection is subdivided into two feed connections 37A and 37B to simplify the illustration. Feed connections 37A and 37B are connected via corresponding ducts with two feed chambers 38 and 40 that are arranged, in each case, on one of the inlet-seat valves 15 and 16. Two chambers 41 and 42—which are separated from feed chambers 38 and 40 when steering valve 15 is in the neutral position—communicate with two cylinder connections 43 and 44. Chambers 41 and 42 are also connected via corresponding penetrations in discs 24 and 25 and via outlet-seat valves 17 and 18—that are open when the steering valve is in the neutral position—with a return connection 45A and 45B, and thus with a pressure medium container (not shown).

On valve plunger 31 of outlet-seat valve 17, there is arranged a step with an activation surface 46 that in the axial direction has a first interval 47 from the front surface of disc 24. When steering valve 14 is in the neutral position, the first interval 47 is smaller than a second interval 48 that exists in the axial direction between the closing surface 35 of plunger 31 and valve seat 28 as seen most clearly in FIG. 2.

Valve plunger 32 bears an axially-directed projection 50 whose front surface, activation surface 51, provides a first interval 52 with respect to disc 25. When the steering valve 14 is in the neutral position, the first interval 52 is smaller than the second interval 53 that exists between the closing surface 36 of plunger 32 and valve seat 30 as seen most clearly in FIG. 3.

FIG. 1 shows the inlet-seat valve 15 and outlet-seat valve 17, on the one hand, and the inlet-seat valve 16 and outlet-seat valve 18, on the other hand, in different forms. The different versions of the valves 15–18 are required so that all valves 15–18—looking in the axial direction—can be arranged on one side of activation disc 13. The two valve parts can have the same shape, that is to say, corresponding either to the left or to the right version in the drawing, if they are arranged in the axial direction on both sides of activation disc 13, for example, in a coaxial manner.

The operation of steering valve 14 is described in greater detail when the steering rack auxiliary power steering is activated. When the steering valve 14 is in the neutral position, the two feed chambers 38 and 40 are closed off hermetically so that no pressure medium is used up. In this neutral position, the two cylinder connections 43 and 44 are connected with return connections 45A, 45B, as a result of which the steering gear can be reversed unhindered.

If the steering spindle is turned such that the oblique toothing of pinion 2 exerts a force component against the pinion 2 in the upward direction, then this force component remains ineffective until such time as the force of the first spring arrangement 10 has been overcome. Pinion 2 is shifted upward after this boundary force has been overcome, that is to say, the force up to which the steering is done purely mechanically. The force of pressure springs 22, 33, 34 pushes valve plungers 31 and 32 likewise upward and keeps pushing member 29 and valve plunger 32 constantly resting against activation disc 13. In connection with this movement, activation surface 46 of valve plunger 31 first comes to rest against disc 24 and lifts pressure spring 22 over that disc 24 away from closing body 20. As a result, closing body 20 is free of forces from pressure spring 22. As valve plunger 31 is shifted further, after passing the second interval 48, closing surface 35 of outlet-seat valve 17 comes to rest against valve seat 28 and thus closes outlet-seat valve 17. Outlet seat-valve 18 is opened further. Upon further movement of valve plunger 31, closing body 20 of inlet-seat valve 15 is engaged and taken along and inlet-seat valve 15 is opened. This results in a pressure medium flow from feed connection 37A via feed chamber 38, opened inlet-seat valve 15 to cylinder connection 43. Cylinder connection 43 is connected with one side of the servomotor. From the other side of the servomotor, pressure medium flows back to the second cylinder connection 44 and from there, via chamber 42 and outlet-seat valve 18, to return connection 45B.

When the pinion 2 is turned in the opposition direction, the pinion 2 is shifted downward after overcoming the boundary force of pressure springs 22, 33, 34. While outlet-seat valve 17 is further opened on the left valve, activation surface 51, in the case of the right valve, first comes to rest against disc 25, so that the latter lifts pressure spring 23 off closing body 21 of inlet-seat valve 16. This means that closing body 21 is free of spring forces. In case of a further shift, after the second interval 53 has been passed, closing surface 36 of outlet-seat valve 18 comes to rest against valve seat 30. Then closing body 21 of inlet-seat valve 16 is lifted off valve seat 27 so that inlet-seat valve 16 will be opened. Pressure medium then flows from feed connection 37B via opened inlet-seat valve 16 and cylinder connection 44 to the other side of the servomotor and from one side of the servomotor, via cylinder connection 43 and the opened outlet-return valve 17, back to return connection 45A.

In the practical examples shown, the inlet-seat and outlet-seat valves 15, 16 and 17, 18, respectively, are controlled via the oblique toothing of pinion 2 as the latter is shifted axially. The valves 15–18 can be adjusted with the same effect also by other suitable, in themselves known means, for example, by an oblique screw-cutting or by an activation rocker.

The foregoing description is not to be construed as limiting the invention in any way. The scope of the invention is to be determined from the claims attached hereto.

I claim:

1. An auxiliary power steering usable in motor vehicles for providing power steering which requires a substantially constant force on the steering wheel for activation, the auxiliary power steering having a steering valve assembly with a housing for providing fluid to a servomotor, said steering valve assembly comprising:

a pinion arranged in an axial direction in the housing;

first and second plungers located in said housing and mounted for movement in the axial direction from a neutral position to an activated position;

first and second axially movable discs positioned axially concentric with said first and second plungers, respectively, first and second pressure springs each fixed at a first end in said housing with a second end positioned to exert pressure in the axial direction on said first and second plungers, respectively, to cause movement of said plungers from the neutral position to the activated positions responsive to rotation of said pinion;

a third pressure spring fixed at a first end in said housing and having a second end attached to the first axially movable disc for exerting pressure thereon in the axial direction opposite the direction of the pressure exerted by the first pressure spring;

first and second inlet-seat valves located in said housing and provided with inlet valve seats and first and second outlet-seat valves located in said housing, said first inlet-seat valve and said first outlet-seat valve having a first closing body associated therewith, and said second inlet-seat valve and said second outlet-seat valve having a second closing body associated therewith;

each of said first and second closing bodies having a first end which forms an outlet valve seat and a second end positioned in abutment with said first and second axially movable discs, respectively, when said first and second plungers are in the neutral position, each of said closing bodies being provided with a feed chamber in fluid communication with said inlet-seat valve, each of said feed chambers including a protruding contact surface at the end thereof closest to the second end of each closing body which is adapted to rest on each of said inlet valve seats, respectively, when said plungers are in the neutral position, and said closing bodies being mounted for axial movement in said housing; and said first and second plungers each including an activation surface and a closing surface, each of said activation surfaces being positioned to engage the axially movable discs upon axial movement of said plungers, and each of said closing surfaces being positioned to abut said outlet valve seats of said closing bodies upon axial movement of said plungers beyond the point where said first and second activation surfaces engage respective axially moveable discs, to thereby close said outlet-seat valves and cause axial movement of said closing bodies whereby said first inlet-seat valve is opened when the first plunger is in the activated position and the second inlet-seat valve is opened when the second plunger is in the activated position.

2. An auxiliary power steering as claimed in claim 1 wherein said first and second axially movable discs each further comprise a fluid channel therethrough for providing fluid communication between a servomotor and said outlet-seat valves when said plungers are in the neutral position.

3. An auxiliary power steering as claimed in claim 2 wherein said pinion includes helical teeth which engage a steering rack whereby rotation of said pinion causes axial movement thereof.

4. An auxiliary power steering as claimed in claim 3 wherein said pinion includes a circumferential shoulder which abuts against a centering collar mounted for axial movement around said pinion whereby axial movement of said pinion causes axial movement of said centering collar.

5. An auxiliary power steering as claimed in claim 4 wherein said first and second pressure springs exert pressure on said centering collar in the axial direction via said plungers and further comprising a spring arrangement mounted in said housing such that it axially biases said centering collar in a direction opposite the direction of pressure exerted by said first and second pressure springs.

6. An auxiliary power steering as claimed in claim 5 further comprising an activation disc mounted for axial movement around said pinion and positioned such that said first and second pressure springs exert pressure on said activation disc via said plungers, said activation disc being associated with said centering collar in a manner whereby said activation disc moves axially along with said centering collar.

7. An auxiliary power steering as claimed in claim 6 further comprising a first axial bearing positioned between said activation disc and said centering collar.

8. An auxiliary power steering as claimed in claim 7 further comprising a bearing disc attached to said spring arrangement and a second bearing located between the bearing disc and the centering collar, and wherein the housing further includes an annular guide shoulder positioned for abutment with said bearing disc to thereby limits the axial movement of said bearing disc responsive to the pressure exerted thereon by the spring arrangement.

9. An auxiliary power steering as claimed in claim 1 further comprising a fourth pressure spring fixed at a first end in said housing with a second end attached to the second axially movable disc to exert pressure thereon in the axial direction opposite the direction of the pressure exerted by the second pressure spring.

* * * * *